United States Patent [19]
Terpstra

[11] Patent Number: 6,041,500
[45] Date of Patent: Mar. 28, 2000

[54] AUTOMATIC ASSEMBLY MACHINE AND METHOD UTILIZING SIX-AXIS POSITIONING DEVICE

[75] Inventor: Paul D. Terpstra, Janesville, Wis.

[73] Assignee: Giddings & Lewis, Inc.

[21] Appl. No.: 09/012,715

[22] Filed: Jan. 23, 1998

[51] Int. Cl.[7] .................................................. B23P 21/00
[52] U.S. Cl. ................................. 29/889.21; 29/889.22; 29/889.5; 29/23.51; 29/703
[58] Field of Search .................... 29/23.51, 701, 29/703, 72 D, 714, 464, 466, 468, 889.21, 889.22, 889.2, 889.5

[56] References Cited

U.S. PATENT DOCUMENTS

| | | | |
|---|---|---|---|
| 3,668,773 | 6/1972 | Achterberg | 29/429 |
| 3,681,837 | 8/1972 | Franklin | 29/211 D |
| 3,691,618 | 9/1972 | Achterberg | 29/430 |
| 4,651,589 | 3/1987 | Lambert | 74/469 |
| 4,806,068 | 2/1989 | Kohli et al. | 901/17 |
| 4,819,496 | 4/1989 | Shelef | 901/21 |
| 4,988,244 | 1/1991 | Sheldon et al. | 409/132 |
| 5,028,180 | 7/1991 | Sheldon et al. | 409/201 |
| 5,207,097 | 5/1993 | Gutman | 73/162 |
| 5,354,158 | 10/1994 | Sheldon et al. | 409/201 |
| 5,388,935 | 2/1995 | Sheldon et al. | 409/201 |
| 5,466,085 | 11/1995 | Sheldon et al. | 403/157 |
| 5,489,168 | 2/1996 | Sheldon et al. | 409/235 |
| 5,556,242 | 9/1996 | Sheldon et al. | 409/132 |

OTHER PUBLICATIONS

D. Stewart, "A Platform with Six Degrees of Freedom", *Proceedings of The Institution of Mechanical Engineers* (vol. 180, Pt. 1, No. 15, pp. 371–386, 1965–1966).

*Primary Examiner*—Irene Cuda
*Attorney, Agent, or Firm*—Foley & Lardner

[57] ABSTRACT

An apparatus and method for automatically assembling a plurality of identical first articles onto a second article. The second article is supported by a platform which is movable about three linear axes and three rotational axes by a six-axis positioning device. The first articles are held in a fixed position and the second article is positioned so as to insert the first articles into the second article as required. In the preferred embodiment, a torque converter turbine drum is supported by the platform to engage turbine blades which are supported in fixed position with respect thereto. The turbine drum is rotated with respect to the blades so as to permit the insertion of the blades into the drum by rotation and positioning of the drum in six axes.

31 Claims, 5 Drawing Sheets

AUTOMATIC ASSEMBLY MACHINE AND METHOD UTILIZING SIX-AXIS POSITIONING DEVICE

FIELD OF THE INVENTION

The present invention generally relates to an automated assembly machine and a corresponding method for assembling a plurality of substantially identical first articles onto a second article. More particularly, the present invention relates to an automatic assembly machine and method for inserting foil-like turbine blades into a torque converter turbine drum.

BACKGROUND OF THE INVENTION

The assembly of foil-like turbine blades into torque converter turbine drums for use in automobile transmissions and similar applications has long presented difficult assembly problems to torque converter manufacturers. Such torque converter assemblies generally include a dish-like turbine drum or housing that resembles the outer half portion of a shell of a toroid which has been split in half in a plane perpendicular to the central axis of the toroid. A ring of turbine blades, located inside the concave turbine drum, imparts or receives fluid pressure in response to movement of other parts of the torque converter. Such torque converter turbine blades are typically curved in three planes and secured within the dish-like turbine drum in non-radial positions.

Specially designed automatic assembly machines have been developed for assembly of torque converters due to the necessary precision and speed at which the turbine foils or blades are to be inserted into the dish-like turbine drum. However, it has been necessary to individually design an automatic assembly system for each blade and drum combination manufactured. Each automatic assembly machine is particularly adapted for the assembly of the unique combination of a certain size and type of turbine blade to be positioned and inserted into a particular size and type of turbine drum. Some examples of such assembly systems and methods are set forth in the following patents, all of which are assigned to the assignee of the present invention: U.S. Pat. Nos. 3,668,773—Achterberg; 3,691,618—Achterberg et al.; and 3,681,837—Franklin. These three patents are hereby incorporated by reference.

The Achterberg '773 patent discloses an assembly machine and method wherein a drum or housing is angularly indexed to successive positions as it is rotated about a fixed axis. A turbine blade is taken from a feeding magazine and is carried by a clamp attached to an offset load arm, which is mounted for oscillatory rotation about a load arm shaft. Rotation of the load arm shaft causes the offset load arm to present the blade in a rolling arcuate path to the drum, such that tabs provided on the blade may be inserted into slots in the drum.

The Achterberg et al. '618 patent discloses an automatic assembly machine and method in which the turbine blades are deformed and held by a linear transfer device prior to inserting a first blade ear into a drum, thereby locating the blade in a preliminary position prior to hammering the blade into its finally assembled position in the drum. After the blade has been placed in its preliminary position in the drum, the blade is permitted to spring toward its final position, and is then driven by a mechanical blow provided by a hammer-like operating member of the assembly machine.

Finally, the Franklin '837 patent discloses a similar automatic assembly system, wherein a first hammer mechanism is used to cam and hammer a first blade ear into a preliminary position in a drum. The blade is then urged into its finally assembled position in the drum by the camming and hammering motion of a second hammer.

In the automatic assembly machines set forth in the three above-mentioned patents, the torque converter drum is supported for rotation about a fixed axis, whereby it may be incrementally rotated to present a slot therein for receipt of a tab on the foil-like blades which are inserted by a transfer device having a linear motion. Due to the inherent limitations of the linear-action machines in attempting to perform the complex insertion motions required to insert curved blades into a curved drum, the design of such assembly systems has been quite difficult. Moreover, due to the complex part geometries and the part tolerance interrelationships, it is often necessary that the curved turbine blades be assembled into curved turbine drums by hand or, alternatively, that they be assembled with the assistance of relatively elementary equipment which cannot be operated automatically.

While prior blade-insertion systems have been designed as described in the above-mentioned patents to accomplish the desired task, the precision necessary in the presentation of the blade to the drum has required that a separate assembly machine be designed for each specific combination of turbine blade and drum. Furthermore, the tolerances are often so precise that if the blades (which are intended to be identical) are made on stamping presses with different dies, the slight variations in the blades made with the different dies frequently necessitates that an assembly machine be re-adjusted or re-calibrated for the insertion of blades made from the different stamping die.

Thus, it would be most desirable to provide an automatic assembly machine, particularly one for use in assembling foil-like blade inserts into a torque converter turbine drum, which could be readily adapted for use in assembling a variety of turbine blades with a variety of turbine drums. It would also be desirable to provide such an assembly machine having the necessary precision for insertion of the blades with respect to the drum, without the need for precise construction of the components of the assembly machine, or the even more precise readjustment of the components of the assembly machine during the manufacturing process.

SUMMARY OF THE INVENTION

The present invention provides the desired automatic assembly machine which, when operated by a control system, is capable of positioning two articles in any desired location with respect to each other, and is further capable of locating the two articles in a continuous succession of desired locations with respect to each other, all without the need to make alterations or adjustments to the mechanism.

The inventor has found that the most efficient and accurate method of part insertion for certain complex part geometries is one that duplicates or simulates the complex motion of a human hand. For example, in the preferred embodiment of inserting a curved turbine blade into a curved turbine drum, a human assembler performs a complex series of motions, including a "wiping action" and a "twisting action", to accomplish the blade insertion. This series of linear and rotational motions is too complex to be readily duplicated with conventional linear-action assembly mechanisms.

The inventor has further discovered that these complex motions can readily be performed by a positioning device which provides six degrees of freedom of movement, and is commonly known as a six-axis machine. An early six-axis machine, called the "Stewart System", is described in an article entitled "A Platform with Six Degrees of Freedom", by D. Stewart, published in *Proceedings of The Institution of Mechanical Engineers* (Vol. 180, Pt. 1, No. 15, pp. 371–86, 1965–66). The six-axis Stewart System has been employed in various applications since it was first developed, including its well-known use as the support mechanism for the cockpit of a flight simulator.

A variation of the six-axis Stewart System has also been used in machine tools. The assignee of the subject invention is also the assignee of the following seven patents which relate to six-axis machine tool technology: U.S. Pat. Nos. 4,988,244—Sheldon et al.; 5,028,180—Sheldon et al.; 5,354,158—Sheldon et al.; 5,466,085—Sheldon et al.; 5,489,168—Sheldon et al.; 5,556,242—Sheldon et al.; and 5,388,935—Sheldon. These seven patents are hereby incorporated by reference.

All of these patents generally relate to a six-axis machine tool for locating a tool head with respect to a workpiece, and, more particularly, to a versatile machine tool in which the tool head can be moved in three lineal directions and three rotational directions in relation to the surface of the workpiece. As the six extensible legs of the hexapod machine tool are independently controlled, the tool holder is moved along a desired path with respect to the workpiece to perform various machining operations on the workpiece.

By using this six-axis machine technology, the present invention is able to simulate the complex "wiping" motion and "twisting" motion that a human assembler would use to hand-insert the turbine blades into the drum. Moreover, the present invention provides an automatic assembly machine and method having a control system by which the assembly machine may be readily adapted to assemble different combinations of turbine blades into turbine drums. This changeover to a different insertion procedures would be done solely in the control software for the six-axis machine.

Hence, a primary feature of the present invention is to provide an automatic assembly machine which may be configured with a plurality of blade feeding and holding mechanisms for accommodating a plurality of different blades, and which is adaptable to hold a plurality of different drums, wherein the same assembly machine can be readily adapted to assemble different combinations of blades and turbine drums without major mechanical changes.

Another feature of the present invention is to provide an apparatus wherein the turbine drum and blades are readily movable on six axes with respect to each other, whereby the difficulties presented by the limited linear movement of the blades with respect to the shell of the prior assembly machines are eliminated.

Still another feature of the present invention is to provide an assembly system and method which is of simplified construction and operation.

A further feature of the present invention is to provide a non-dedicated assembly system which can readily be used for numerous other assembly and machining tasks other than the insertion of specific parts.

In accordance with the present invention, an automatic assembly system and method is provided in which a plurality of first articles, such as turbine blades, are inserted into a second article, such as a turbine drum, which is supported on a platform that provides for three linear (orthogonal) directions of motion and three rotational directions of motion with respect to the first article. The assembly machine is further provided with one or more mechanisms for feeding the first article, or turbine blades, at a fixed position in close proximity to the second article, or turbine drum. The turbine drum is held on the support platform for rotation about a predetermined axis. The drum is intermittently rotated about the predetermined axis, so as to properly locate it for the insertion of successive turbine blades. Depending upon the particular combination of turbine blades and drum, the support platform can be programmed to engage the turbine drum, mounted on the support platform, with a particular blade using a predetermined relative movement, such that the blade and drum are first positioned for partial engagement and then the blade is fully engaged with the turbine drum. This is accomplished in the preferred embodiment using a "wiping motion" and a "twisting motion" in a similar manner to that which is performed by hand insertion, although other multiple-axis positioning movements could be used.

In a typical torque converter, a turbine drum is provided with slots for receiving tabs provided on the foil-like inserts or blades. With a blade held in a fixed position relative to the drum, the platform is moved as required to engage at least a first slot in the drum with at least a first tab of the blade. This is accomplished in the preferred embodiment using a "wiping motion" of the surface of the drum across the first tab. Once the first tab is partially engaged, the position of the platform is then adjusted as necessary to engage the remaining slots with the remaining tabs on the blade. Due to the engagement of at least a first tab in the first slot in the drum, further movement of the blade with respect to the drum may result in a slight deformation of the blade if necessary to locate the remaining tabs of the blade in slots in the drum. Since the blades may be formed with other than a planar profile, deformation of the blade may be desirable for several reasons, including improved performance of the assembled turbine drum, and for temporarily securing the blades to the drum. In the preferred embodiment, all the tabs of the blade are finally seated into the slots using a "twisting motion" of the platform. These wiping and twisting actions may include complex motions such as rotations about one or more non-parallel axes, and such complex motions can readily be performed using a six-axis positioning device in accordance with the invention.

BRIEF DESCRIPTION OF THE DRAWINGS

The features of the present invention which are believed to be novel are set forth with particularity in the appended claims. The invention itself, however, together with further objects and advantages thereof, may best be understood by reference to the following description, when taken in conjunction with the accompanying drawings, in which:

DETAILED DESCRIPTION OF THE PREFERRED EMBODIMENTS

Figure 1:
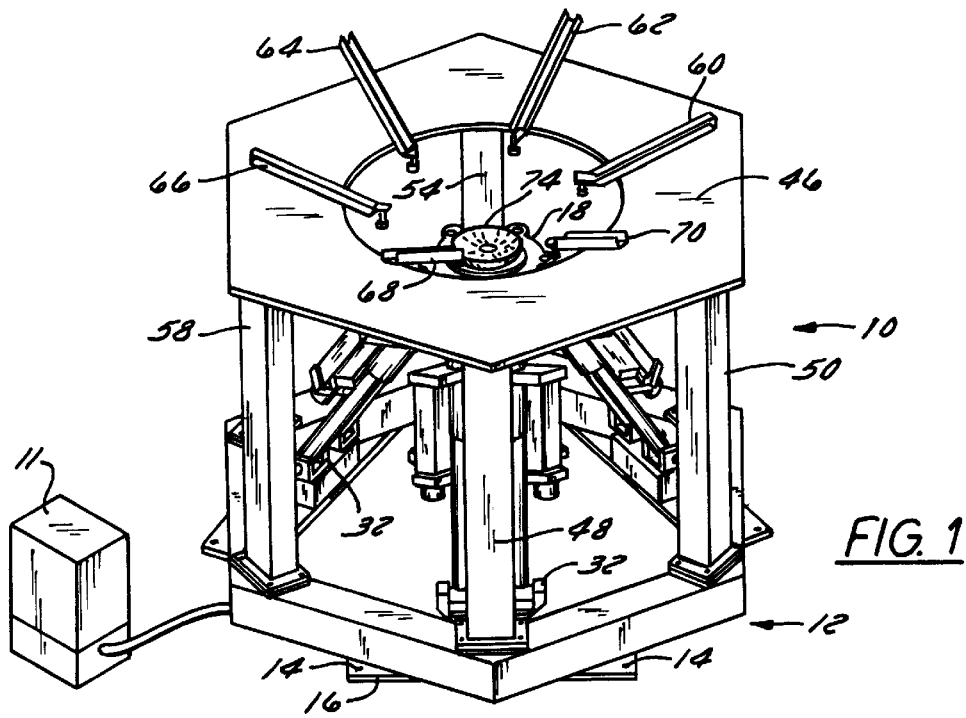
FIG. 1 is an overall perspective view of the present invention generally showing an assembly system for inserting turbine blades into a turbine drum.
Figure 2:
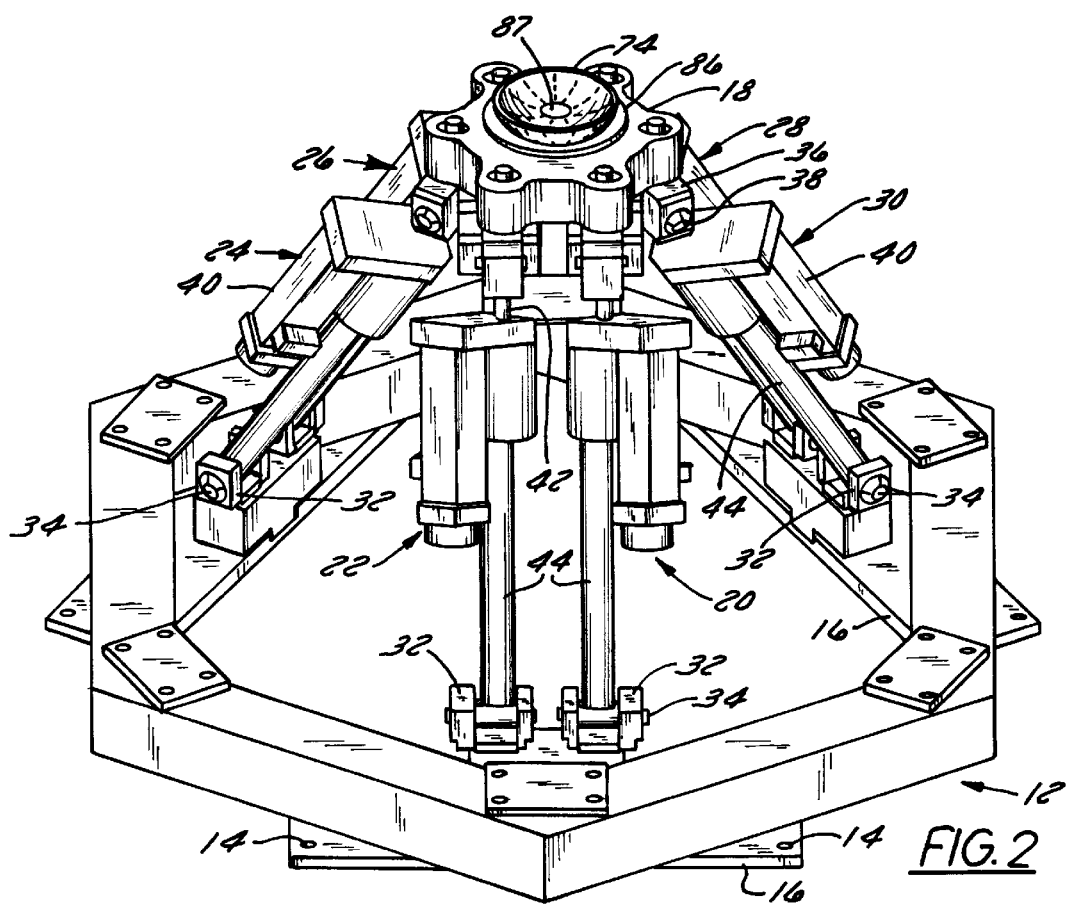
FIG. 2 is an enlarged perspective view of the assembly machine of FIG. 1, wherein the top portion has been removed to better show the platform supporting structure of the assembly machine.
Figure 3:
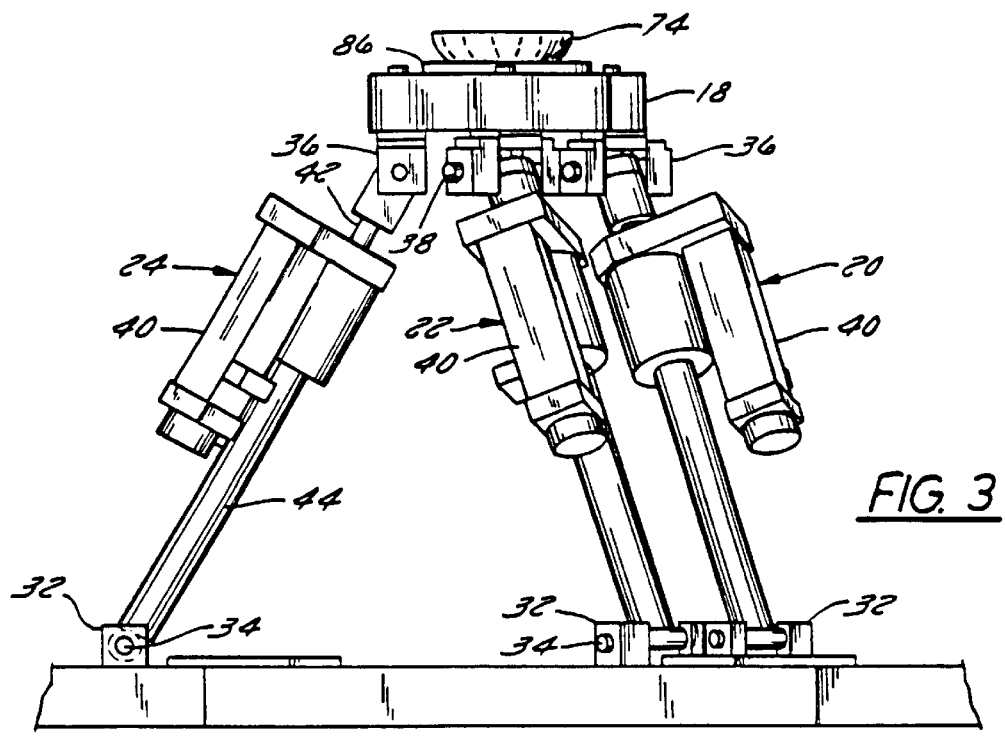
FIG. 3 is a side view of the portion of the platform supporting structure shown in FIG. 2.
Figure 4:
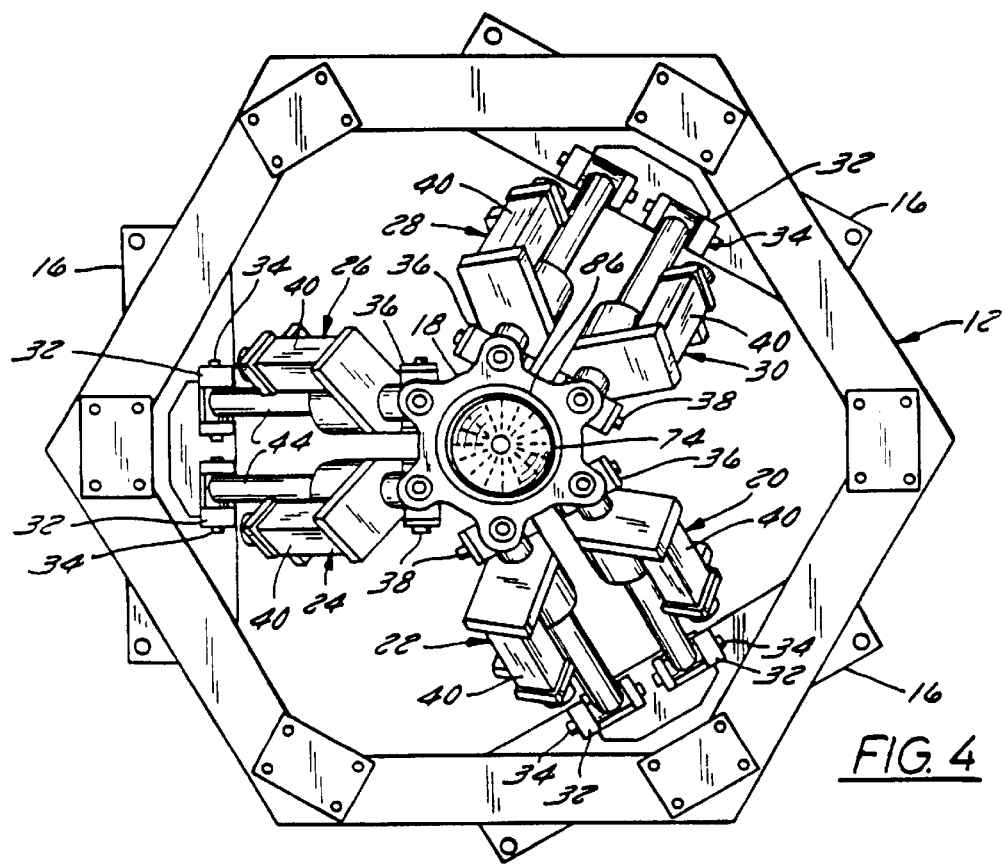
FIG. 4 is a top plan view of the portion of the platform supporting structure shown in FIG. 2.

Referring now to FIGS. 1 through 4, an automatic assembly machine 10 of the assembly system is shown in accordance with the present invention. In FIG. 1, a computer controller 11 is shown connected to the machine 10 to control its movements. The automatic assembly machine 10 includes a positioning device constructed on a hexagonal frame 12, which is secured to a supporting floor or platform (not shown) by fasteners (also not shown) passing through holes 14 in mounting plates 16 which are provided at three corners of the hexagonal frame. A table or platform 18, movable about six axes, is supported on the mounting plates 16 by six powered legs, 20, 22, 24, 26, 28, and 30, each of which includes one of six linear actuators as discussed below. Each of the legs is pivotally supported on one of the mounting plates 16 by a U-shaped bracket 32 and a pin 34 which passes through holes in the arms of the bracket 32 and through a hole in the lower end of the leg. Each of the legs 20–30 are also pivotally secured to the platform 18 by a U-shaped bracket 36 secured to the platform 18 and a pin 38 which passes through holes in the arms of the bracket 36 and through a hole in the upper end of the leg.

Each of the six powered legs has a linear actuator drive mechanism 40, which, when energized, causes an upper portion 42 of the leg to be retracted or extended with respect to a lower portion 44 of the leg. In the preferred embodiment, the linear actuator drive mechanism 40 is a ball-screw system driven by electric servos. However, the linear actuators can alternatively be composed of a fluid or air cylinder, or other equivalent mechanisms. With the proper energization of the actuator drive mechanisms 40, platform 18 can be moved, to some extent, in three orthogonal axes (X-Y-Z), and rotated to some extent, about each of the three orthogonal axis in three rotational axes (A-B-C). The actuator drive mechanisms are controlled by a computer controller 11 as known in the art. The specific details of construction and operation of the legs, actuators, and their control mechanisms are set forth in the above-mention six-axis machine tool patents which have been incorporated herein by reference. Note that an alternative positioning device which could be used with the present invention is shown in those patents wherein the six powered legs are arranged as three pairs of two crossed legs. However, using such crossed-leg hexapod machine tool devices, the platform 18 may not exhibit a sufficient range of motion in all degrees of freedom to adequately position certain articles for assembly. Another alternative positioning device would use three legs, each having two sections, to provide the six degrees of freedom.

Referring specifically to FIG. 1, six identical turbine blade delivery mechanisms are mounted on a support plate 46 which is supported by six columns 48, 50, 52, 54, 56, and 58 that extend from the corners of the hexagonal base 12. The blade delivery mechanisms 60, 62, 64, 66, 68, and 70 are shown mounted on the support plate 46 for storing, feeding, and supporting the blades which are to be inserted into a turbine drum. The blade delivery mechanisms include, or are adapted to receive, a magazine containing a plurality of turbine blades 72. The blade delivery mechanisms feed the blades, one at a time, to blade holders 84 which support an individual blade 72 in a fixed position with respect to the movable platform 18. The specific details of the construction and operation of the blade delivery mechanisms are set forth in the above-mentioned torque converter assembly patents which have been incorporated by reference. Specifically, the magazine stripper and blade holder mechanisms of the preferred embodiment are substantially similar to those described in FIGS. 10–15 of the Achterberg '773 patent.

Figure 5:
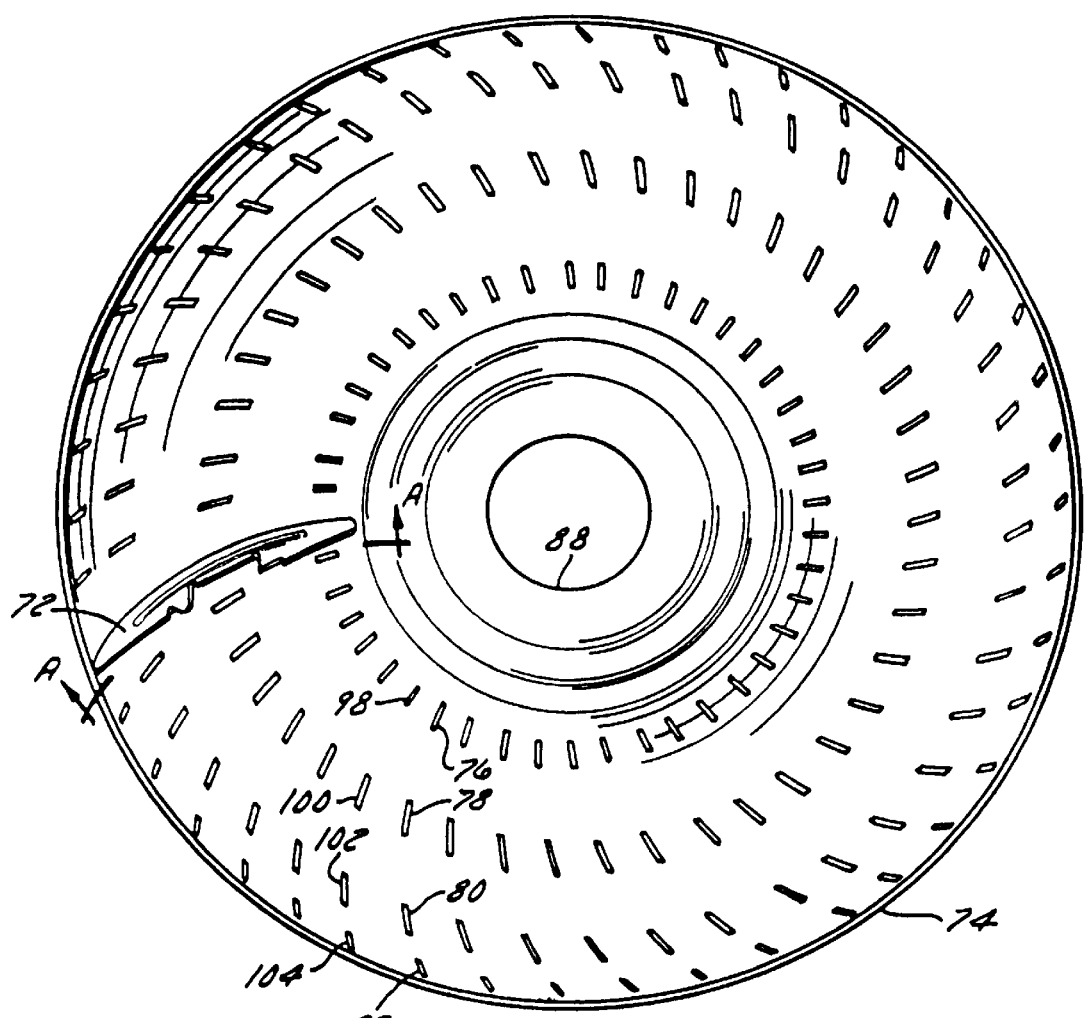
FIG. 5 is a top plan view of a turbine drum with a single turbine blade positioned therein.
Figure 6:
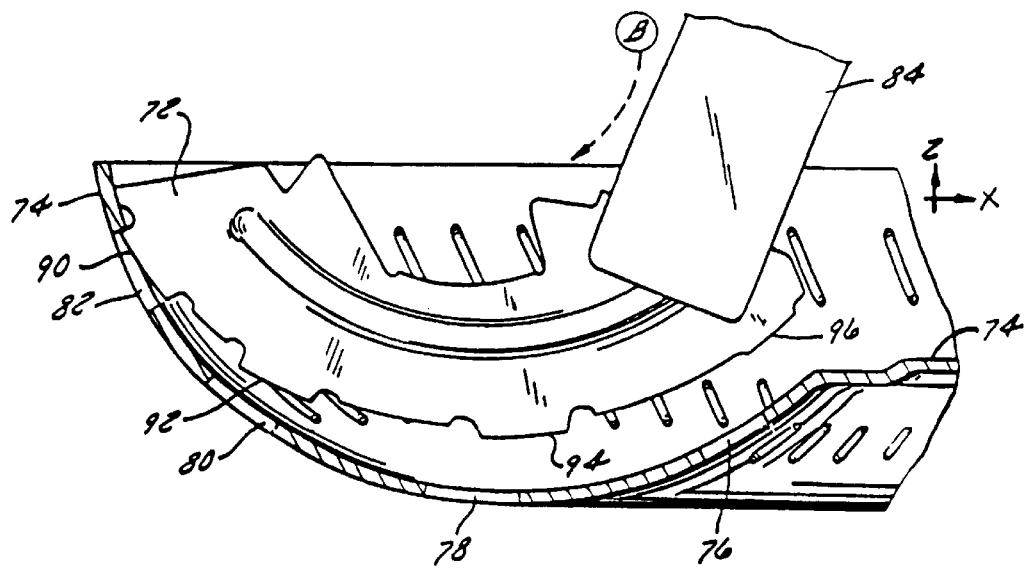
FIG. 6 is an enlarged cross-sectional view of the turbine drum taken along the line A—A of FIG. 5 showing a blade being brought into engagement with the drum by the assembly machine of the present invention.
Figure 7:
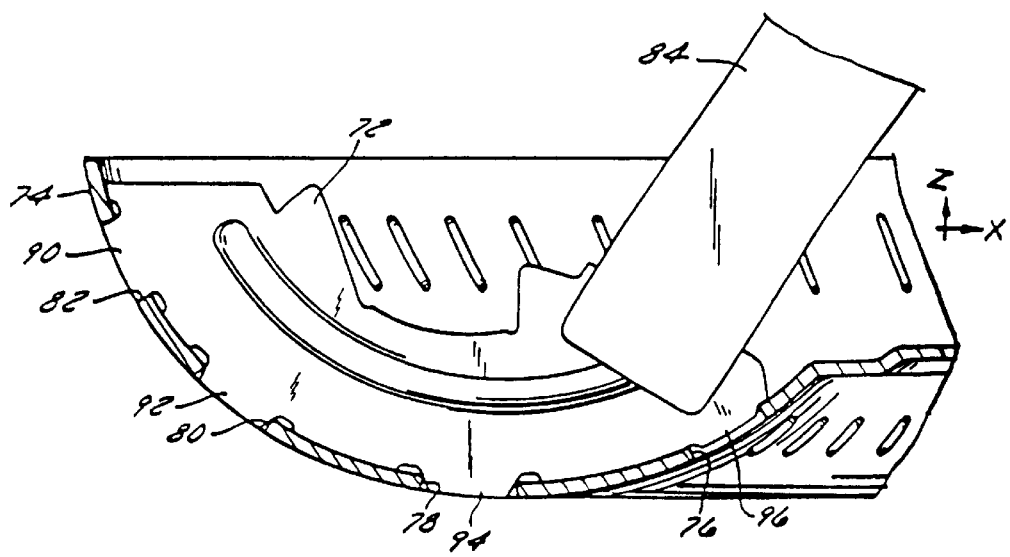
FIG. 7 is a view similar to FIG. 6, showing the turbine blade having been brought into full engagement with the turbine drum.

As shown in FIGS. 5 through 8, an individual turbine blade 72 is inserted and held in a fixed position with respect to the turbine drum 74. The drum 74 is provided with a plurality of slots 76, 78, 80, and 82 for receiving the tabs of an individual blade 72. The slots are located along an arcuate path on the toroidal surface of the drum 74, as shown in FIG. 5. The blade holder 84, partially shown in FIGS. 6 and 7, is used to hold the blade 72 as it is fitted into the drum, as will be described below.

Referring again to FIGS. 1 through 4, the drum 74 is supported on a drum holder 86 which is mounted for rotation on the top of the platform 18. In one embodiment, a drive mechanism (not shown) is provided for incrementally rotating the drum holder 86 with respect to the platform 18. In this embodiment, the drum holder 86 is a servo-operated turntable controlled by the computer controller 11, although in another embodiment, the positioning device could utilize its C-axis rotation around the Z-axis to serve this function. A clamping mechanism 87 is provided on the holder 86 for engagement in a hole 88 in the center of the drum 74, for securing the drum 74 to the holder 86. The clamping mechanism 87 is preferably an expanding mandrel, such as the type shown in FIG. 9 of the above-mentioned Achterberg '773 patent, or such as known in the art. In accordance with known automated manufacturing processes, a conveyor feed mechanism (not shown) is used to move a drum 74 into position on the holder 86 to be secured by clamping mechanism 87 for insertion of blades 72. After the drum 74 has been filled with blades, the clamping mechanism 87 is released and the conveyor feed mechanism removes the drum filled with blades and positions another empty drum to be secured by the clamping mechanism 87.

With a blade 72 clamped in blade holder 84, and with a drum 74 clamped on the drum holder 86, one or more of the powered legs 20–30 are energized in a predetermined series of complex motions to move the drum slots over the blade tabs such that the blades become inserted into the drum in a sequential manner as will be discussed in detail below. Generally, the positioning device moves to position the drum 74 with respect to the blade holder 84 such that the first slot 82 of the drum 74 (FIG. 6) can receive at least a corner portion of the first tab 90 of the blade 72 as the drum holder 86 is rotated with respect to the platform 18. After the first tab 90 at least partially slides into the first slot 82, one or more of the powered legs 20–30 are energized in another predetermined sequence to move the drum 74 such that the tab 90 is then fully inserted into slot 82, and to align the drum 74 such that the next tab 92 will begin to move into the next slot 80, and subsequently, the tab 94 into the slot 78, and the tab 96 into the slot 76.

Depending upon the curvilinear shape of the blade 72 and the location of the slots 76 through 80, further rotation of the drum holder 86 may be required to engage the remaining tabs 92 through 96 into the remaining slots 76 through 80. Depending on the configuration of the particular turbine blade, the rotation of the drum holder 86 may have to be stopped when the first tab 90 has entered into the first slot 82, and the platform 18 tilted to move the drum 74 such that the remainder of the tabs are engaged in the remainder of the slots. In either case, one or more of the powered legs 20–30 are sequentially energized to move the drum 74 to bring the tabs 90 through 96 into full engagement with the slots 76 through 82 as shown in FIG. 7. With the tabs of the blade 72 fully engaged in the slots in the drum 74, the blade holder 84 releases the fully inserted blade and is then provided with another blade for insertion into the next series of slots 98 through 104 (FIG. 5).

In another embodiment of the invention, no drive mechanism is provided for the drum holder 86 such that it is securely affixed to the platform 18. In this case, after a blade 72 is fully inserted in a drum 74, the clamping mechanism 87 is slightly loosened so the drum can rotate, and the platform 18 is slightly lowered and then rotated in such a way as to push the just-inserted blade sideways against the blade holder 84 as the clamping mechanism is being retracted. This serves to rotate the drum through a predetermined indexing angle with respect to the platform. The platform is then rotated back through the same predetermined angle, in the opposite direction, in order to position the next series of slots to receive a blade. The clamping mechanism 87 is then re-engaged, and the drum is now positioned to receive the next blade.

In an alternative embodiment of the present invention, the blade holder 84 may itself include the operations of moving from an insertion to a retracted position in addition to the feeding and clamping of a blade. These blade holder operations are typically controlled and powered by compressed air.

As a new drum 74 is moved by a feed conveyor into position over the platform 18, the platform is raised to lift the drum 74 off the conveyor input track, where the clamping mechanism 87 is engaged to secure the drum to the drum holder 86. One or more of the powered legs 20–30 are again operated to rotate and move the drum 74 so as to position a first slot 82 over tab 90 of a blade. Continued rotation and adjustment of the position of the drum by the platform 18 wipes the remaining tabs across and into the remaining slots. After the drum has been entirely filled with blades, the platform re-positions the drum 74 to be received on a discharge conveyor (not shown). The drum is then unclamped, and the platform 18 is lowered away from the drum, thereby depositing the drum on the discharge conveyor. After the feed conveyor has positioned another drum over the platform, the platform is raised and the drum is clamped thereto to repeat the cycle set forth above.

In accordance with the present invention, the activation of the linear actuators 40 of each of the powered legs 20–30 are controlled by a computer program executed by the controller 11. Such being the case, the assembly machine may be programmed to position a variety of different drums to receive a variety of different blades. Furthermore, the assembly machine may be provided with different blade delivery mechanisms, such that each of the six blade delivery mechanisms shown in FIG. 1 might be used for a different type of blade. By programming the operation of the powered legs 20–30 and using different blade delivery and drum clamping mechanisms, the automatic assembly machine of the present invention may be used to insert numerous different types of blades into various different drums.

The operation of the automatic assembly machine and method of the present invention is summarized in the following steps:

Step A: An automated feed system places a drum at a location disposed over the positionable platform.

Step B: One or more of the powered legs supporting the platform are energized to lift the drum off of the feed system, and a clamp is operated to secure the drum to the platform.

Step C: One or more of the powered legs are energized to move the platform and drum toward a blade which is held by the stationary blade holder in a position ready to be inserted.

Step D: Rotation of the platform and/or drum holder wipes the drum slot across the first outer tab of the blade until the blade snaps into the drum slot.

Step E: Continued rotation of the platform and/or drum holder and further movement of the platform wipes the remaining blade tabs across and into the remaining slots in the drum.

Step F: After all of the tabs of a particular blade are inserted into slots in the drum, the platform is partially lowered and the clamp on the drum is partially released so the drum can rotate. (Note that, in this embodiment, no drive mechanism is used to rotate the table 86, as described above.)

Step G: The platform is then rotated in such a way as to push the just-inserted blade sideways against the blade holder so as to cause the drum to rotate or slide with respect to the platform by the same rotational angle as that between adjacent blades.

Step H: The clamp on the drum is re-engaged and the platform is then rotated back through the same angle to bring the slots for receiving the next blade into position below the blade holder.

Step I: Another blade is brought into position against the drum, and Steps D–H are repeated until all of the drum slots have been filled with blades.

Step J: The automated feed system is positioned to receive the drum filled with blades, the filled drum is unclamped, and the filled drum is lowered onto the feed system track.

Figure 8:
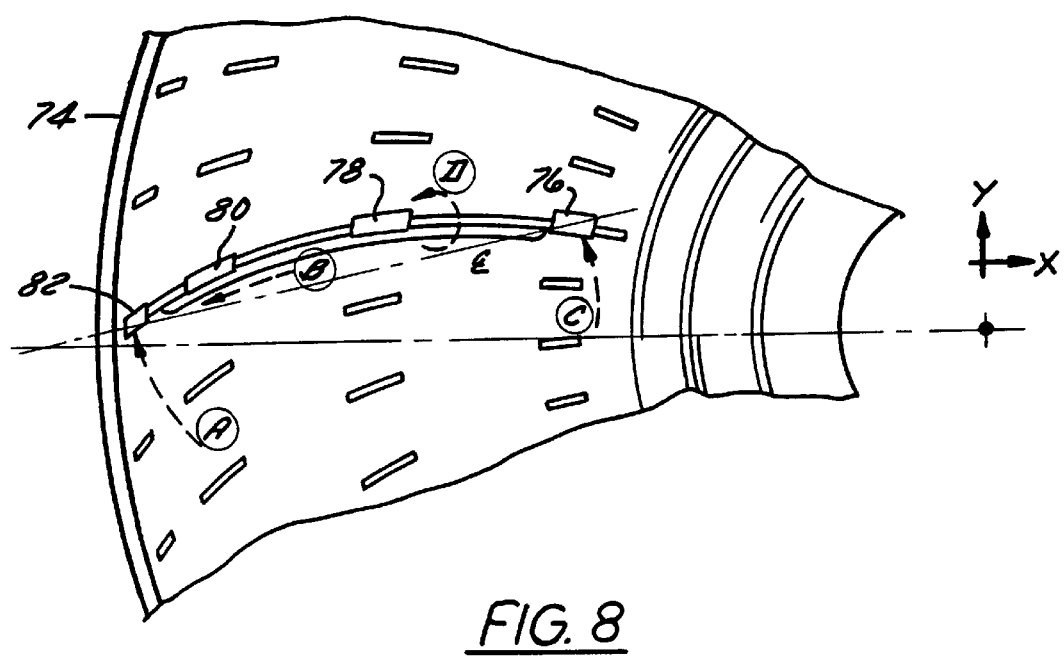
FIG. 8 is an enlarged partial top plan view of the turbine drum of FIG. 5 showing the directions of the wiping and twisting motions used in the preferred embodiment to insert the turbine blade into the drum.

FIG. 8 is an enlarged partial top plan view of the turbine drum of FIG. 5 for providing a more detailed explanation of the complex sequence of motions used to insert the turbine blade into the turbine drum. The following blade insertion steps will be described, only for purposes of explanation of the relative movements, as if the blade was moving with respect to a stationary drum, instead of a moving drum. However, it should be understood that, in the preferred embodiment, the positioning device moves the drum with respect to a fixed blade, as shown in FIGS. 1–4.

As mentioned above, in the preferred embodiment of a torque converter turbine assembly, a human assembler actually performs a "wiping action" and a "twisting action" to insert the blade into the drum by hand. The six-axis positioning device can be programmed via the controller software to duplicate these wiping and twisting motions to accomplish the same purpose. By "wiping" the outer tip of the first tab 90 of the blade 72 across the surface of the drum 74, the position of the first slot 82 can be located and the tab partially engaged. By "twisting" the portion of the blade near tab 96 while tab 90 is inserted in the slot 82, the blade can be fully seated in all the slots. Due to the complex geometries involved, each of these wiping and twisting motions occur by applying a force along a curved path, as will be seen below. Hence, the positioning device produces complex movements in multiple axes to assemble the article.

According to one preferred method of insertion, the blade tabs are inserted in sequential order starting with the outer-most tab 90, then tab 92, then tab 94, and finally tab 96, as described above. In another preferred method, the middle tabs are inserted last as described in accordance with the following steps shown in FIGS. 6–8:

Step 1: The positioning device grasps the blade 72 using the blade holder 84 approximately at the inner end (near inner tab 96) which is opposite the outer end (having the outer tab 90 which is to be inserted first into the outer slot 82) as shown in FIG. 6;

Step 2: The outer end of the blade 72 is moved in a first laterally curved direction (as shown by Direction Arrow A of FIG. 8) substantially radially about the inner end of the blade to wipe the outer end tab 90 across the inner curved surface of the drum 74 until the tip portion of the outer tab 90 partially engages and drops into the outer slot 82;

Step 3: The entire blade is moved in a second upwardly curved direction toward the first slot 82 (as most clearly shown by Direction Arrow B of FIG. 6) and approximately in the plane of the blade 72 to fully engage the first tab 90 in the upper portion of the first slot 82;

Step 4: The inner end of the blade 72 is moved in a third direction (as shown by Direction Arrow C of FIG. 8) substantially radially about the first slot 82 and approximately parallel to the first direction to wipe the inner end tab 96 across the inner curved surface of the drum 74 until the inner tab 96 partially engages and drops into the inner slot 76;

Step 5: The entire blade 72 is moved in a fourth direction (as shown by Direction Arrow D of FIG. 8) rotationally about the center line located between the two partially engaged tabs 90, 96 (which is along the approximate major longitudinal axis of the blade 72) to slightly twist the blade 72 until it snaps into place and fully seats all the tabs into all the slots; and Step 6: The blade holder 84 releases the blade 72.

Note that the wiping motions of Steps 2 and 4 are performed by moving one end of the blade along a curved path generally in the Y-axis direction while holding the other end of the blade stationary, which is much more complex than a simple linear motion. Moreover, the twisting motion of Step 5 rotates the top edge of the blade 72 about its two partially seated tabs along the lower edge, generally in the A-axis of rotation about the X-axis but offset by the difference in the angle between (i) the center line between the two partially seated tabs and (ii) the true X-axis of the machine. Again, this is a very complex motion which cannot be readily accomplished with the linear assembly devices known in the art.

Conversely, the six-axis positioning device of the assembly machine 10 of the present invention can be programmed to perform such complex rotations and translations via the controller software program. The software can be modified to adapt to different types of articles and positioning techniques, and then can be stored for later retrieval. In this manner, very few hardware changes have to be made to completely change the assembly machine over to be used with another article. Therefore, the assembly machine of the present invention is not dedicated for use only as a turbine blade assembly machine. Another significant advantage with the present invention is that no hammering of the blades into the drum is required, since very precise insertion movements can be accomplished which allow for assembly using very little force. This, in turn, extends the life of the assembly machine, as well as minimizes the number of broken or damaged articles.

Using the automatic insertion techniques of the present invention, the cycle time between the insertion of blades can be less than 0.9 seconds, and even as little as 0.6 seconds for some articles. Moreover, a force-sensing device, such as force feedback devices or accelerometers, can be used with the powered legs to "feel" the snapping of the blade tabs into the slots and thereby control the force applied by the drum to the blade. Hence, the quality of the article being assembled can readily be monitored during the assembly process.

The differences and advantages of the assembly machine and method of operation, as compared to the known blade loading machines, should now be apparent. The prior machines were very mechanically complex and required a great deal of setup and adjustment time. As many of the mechanisms of those machines are cam driven, a great amount of time and effort is required to adjust or change the operation of the machine. Further, many prior machines were only usable for assembling one type of blade into one type of drum. If either the blade or the drum is to be changed, the machine usually had to be rebuilt to accommodate the change. In the known blade loading machines described above, a first mechanism fed the blade to the drum and then a second moving slide, in the form of a hammer, was required to fully insert the blade tabs into the drum slots. In the prior systems, the blade feeding mechanism not only had to feed the blade, it also had to be moveable to insert the blade into the drum.

According to the system of the present invention, however, the automatic assembly machine is constructed to move the drum in six axes with respect to the blade. By doing so, it is able to move the drum to the blade feeding mechanism, and accurately place the blade tabs into the drum slots. Because the moving drum can pitch and yaw and roll, the curved blade is loaded in a more natural manner than with the existing blade loading machines that work only in a linear fashion. Furthermore, the blade feeding mechanism of the present invention is much less complicated, since it need only feed and hold the blade in a fixed position. Since the adjustments necessary to ensure the proper insertion of the blade tabs into the drum slots are done by simply modifying the computer program controlling the powered leg actuators, the long trial-and-error process of adjusting and testing the blade loading mechanisms is avoided. This significantly reduces the cost of assembly, and especially machine shop assembly and engineering time.

While only particular embodiments of the invention have been shown and described in detail, it will be obvious to those skilled in the art that further modifications and changes may be made thereto without departing from the invention in its broader aspects. For example, different multi-axis movements and other insertion sequences can be programmed into the controller other than the wiping and twisting motions described herein for use with the preferred embodiments. Accordingly, the appended claims are intended to cover all such changes and alternative constructions that fall within the true spirit and scope of the invention.

What is claimed is:

1. An assembly machine for assembling a first article with a second article, the machine comprising:
  a movable platform for supporting the second article;
  a positioning device for supporting the platform on a base and for providing continuously controllable movements of the platform linearly along three substantially orthogonal axes with respect to the base and rotationally about at least two of the orthogonal axes; and a holding mechanism for holding the first article in a fixed position relative to the base, whereby the controllable movements of the platform relative to the holding mechanism cause engagement of the second article into an assembled position with the first article.

2. The assembly machine of claim 1, wherein the positioning device includes at least three powered legs connected to the base at three separate locations and connected to the platform at three separate locations, wherein the three separate locations on the base are angularly disposed from each other by approximately 120 degrees, and the three separate locations on the platform are angularly disposed from each other by approximately 120 degrees.

3. The assembly machine of claim 2, wherein the positioning device includes three pairs of powered legs connected between the base and the platform and arranged as three pairs of two legs each.

4. The assembly machine of claim 1, wherein the platform is provided with a rotational drive mechanism for rotating the second article with respect to the platform.

5. The assembly machine of claim 1, wherein the holding mechanism includes a delivery mechanism for storing, feeding, clamping, and releasing each of a plurality of first articles.

6. The assembly machine of claim 1, further comprising a plurality of holding mechanisms, each configured to hold a first plurality of first articles having a different shape than a second plurality of first articles.

7. The assembly machine of claim 1, wherein the first article includes a plurality of tabs configured to be inserted into a corresponding plurality of slots located inside a curved surface of the second article.

8. The assembly machine of claim 7, wherein the first article is a curved turbine blade for an automotive torque converter, wherein the second article is a curved turbine housing for an automotive torque converter, and wherein the assembly machine is configured to insert a plurality of the curved turbine blades into the curved turbine housing.

9. The assembly machine of claim 1, wherein the positioning device includes at least six powered legs connected to the base and to the platform, and wherein the positioning device provides the platform with six degrees of freedom of continuously controllable movement.

10. The assembly machine of claim 9, wherein the positioning device is configured to position the second article over the first article for partial insertion, and then to controllably move the second article in a sequence of at least three multi-axis movements, each multi-axis movement including simultaneous movements in at least one orthogonal direction and one rotational direction.

11. A system for automatically assembling a plurality of parts into a housing, the system comprising:
  a six-axis positioning device having a base, six powered legs, and a movable platform for supporting the housing, the positioning device configured to provide continuously controllable movements of the platform linearly along and rotationally about three substantially orthogonal axes with respect to the base;
  a holding mechanism for holding the parts in a fixed position relative to the base; and
  a computerized controller configured to provide programmable control of the six-axis positioning device such that the controllable movements of the platform relative to the holding mechanism cause engagement of the parts with the housing.

12. The system of claim 11, wherein the six powered legs are connected to the base substantially at three separate locations and connected to the platform substantially at three separate locations, and wherein the six powered legs are arranged as three pairs of two legs each that extend between the base and the platform.

13. The system of claim 11, wherein the platform includes a housing clamp for clamping the housing to the platform, and wherein the housing clamp can be controlled to loosely hold the housing for rotational movement about its central axis on the platform.

14. The system of claim 11, wherein the holding mechanism includes a delivery mechanism for storing, feeding, clamping, and releasing each of a plurality of parts.

15. The system of claim 11, wherein the housing is a curved turbine housing having a plurality of slots located inside an inwardly curved surface of the housing, and wherein the parts are curved turbine blades, each blade including a plurality of tabs configured to be inserted into the slots.

16. The system of claim 15, wherein the computerized controller is programmed to provide programmable control of the movements of the platform such that the platform is moved along a curved path during engagement of the housing onto each blade tab to wipe the housing over the blade.

17. The system of claim 15, wherein the computerized controller is programmed to provide programmable control of the movements of the platform such that the platform is moved along a curved path during engagement of the housing onto each blade tab to twist the blade to align the tabs for insertion into the slots in the housing.

18. The system of claim 15, wherein the computerized controller is programmed to provide programmable control of the movements of the platform such that the positioning device causes the platform to be moved along a curved path during engagement of the housing onto each blade tab in the following manner:
  (a) the housing is moved in a first curved path substantially in a first direction such that the inner surface of the housing is in contact with and wiped over a first tab of the blade until the tab is at least partially engaged into a slot; and
  (b) the housing is then moved in a second curved path substantially in a second direction at least 45 degrees from the first direction such that the partially engaged tab causes the blade to slightly bend as the remaining tabs are engaged into slots.

19. The system of claim 15, wherein the computerized controller is programmed to provide programmable control of the movements of the platform such that the positioning device causes the platform to be moved along a curved path during engagement of the housing onto each blade tab in the following manner:
  (a) the housing is moved over a first portion of the blade along a first curved path generally in a first direction to wipe a first tab across the inwardly curved surface of the housing until the first tab at least partially engages a first slot;
  (b) the housing is moved over a second portion of the blade along a second curved path generally in a second direction to wipe a second tab across the inwardly curved surface of the housing until the second tab at least partially engages a second slot; and
  (c) the housing is moved with respect to the entire blade along a third curved path at least partially rotationally about an orthogonal axis to slightly twist the blade until the blade snaps into place and fully seats all remaining tabs into corresponding slots.

20. A method of assembling a first article with a second article comprising the steps of:

secure the second article to a six-axis positioning device configured to position the second article using both linear movements along three substantially orthogonal axes and rotational movements about at least two of the orthogonal axes in accordance with a computer program;

holding the first article in a fixed position with respect to the second article with a holding mechanism;

controlling the movement of the six-axis positioning device with respect to the holding mechanism in accordance with the computer program and in such a manner so as to assemble the second article and first article together using a plurality of multiple-axis movements including rotational movements; and releasing the first article from the holding mechanism.

21. The method of claim 20, further including the step of rotating the second article around its central axis from a first position for receiving a first article to a second position for receiving another first article.

22. The method of claim 20, further including the step of moving the second article along a curved path during engagement of the second article onto the first article to wipe the second article over the first article and into an assembled position.

23. The method of claim 20, wherein the first article includes a plurality of engaging portions configured to be sequentially engaged with a corresponding plurality of engaging portions in the second article.

24. The method of claim 23, wherein the first engaging portions on the first article are tabs and the second engaging portions on the second article are slots, and wherein the tabs of the first article are configured to be inserted into the slots of the second article during assembly.

25. The method of claim 23, wherein the first article is a curved turbine blade and the second article is a curved turbine housing.

26. The method of claim 25, wherein the computer program provides programmable control of the movements of the six-axis positioning device such that the turbine housing is moved along a curved path during engagement with the turbine blade, such movements including the steps of:

(a) moving the housing along a first curved path substantially in a first direction such that the inner surface of the housing is in contact with and wiped over a first tab of the blade until the first tab is at least partially engaged into a slot; and (b) then moving the housing along a second curved path substantially in a second direction at least 45 degrees from the first direction such that the partially engaged tab causes the turbine blade to slightly bend as another tab is engaged into a slot.

27. The method of claim 25, wherein the computer program provides programmable control of the movements of the six-axis positioning device such that the turbine housing is moved along a curved path during engagement with the turbine blade, such movements including the steps of:

(a) moving the housing over a first portion of the blade along a first curved path generally in a first direction to wipe a first tab across the inwardly curved surface of the housing until the first tab at least partially engages a first slot;

(b) moving the housing over a second portion of the blade along a second curved path generally in a second direction to wipe a second tab across the inwardly curved surface of the housing until the second tab at least partially engages a second slot; and (c) moving the housing with respect to the entire blade along a third curved path at least partially rotationally about an orthogonal axis to slightly twist the blade until the blade snaps into place and fully seats all remaining tabs into corresponding slots.

28. The method of claim 20, wherein the first article has a plurality of different shapes, and wherein only the computer program has to be modified to allow the six-axis positioning device to engage the plurality of different-shaped first articles with the second article.

29. The method of claim 20, wherein the computer program was modelled according to an analysis of the movements performed by a human hand during manual insertion of the first article into the second article.

30. The method of claim 20, wherein the computer program provides programmable control of the movements of the six-axis positioning device such that the second article is moved along a curved path during engagement with the first article, such movements including a wiping action of the second article over a portion of the first article, and further including a twisting action of the first article to assist in the alignment of the first article for engagement with the second article.

31. An apparatus for assembling a first article with a second article, the apparatus comprising:

means for securing the second article to a six-axis positioning device adapted to position the second article using both linear movements along three substantially orthogonal axes and rotational movements about at least two of the orthogonal axes in accordance with a computer program;

means for holding the first article in a fixed position with respect to the second article with a holding mechanism and for subsequently releasing the first article from the holding mechanism; and means for controlling the movement of the six-axis positioning device with respect to the holding mechanism in accordance with the computer program and in such a manner so as to assemble the second article and first article together using a plurality of multiple-axis movements including rotational movements.

* * * * *